United States Patent
Call et al.

(10) Patent No.: US 6,346,350 B1
(45) Date of Patent: Feb. 12, 2002

(54) STRUCTURALLY STABLE FUSIBLE BATTERY SEPARATORS AND METHOD OF MAKING SAME

(75) Inventors: Ronald W. Call, Rock, SC (US); Pierre C. Cook, Concord, NC (US); Shawn E. Hux, Gastonia, NC (US); Khuy Van Nguyen, Charlotte, NC (US); Wei-Ching Yu, Spartanburg, SC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/296,682

(22) Filed: Apr. 20, 1999

(51) Int. Cl.[7] .................. H01M 10/50; H01M 2/16; H01M 2/18
(52) U.S. Cl. .................. 429/249; 429/62; 429/144
(58) Field of Search ........................ 429/249, 206, 429/62, 144

(56) References Cited

U.S. PATENT DOCUMENTS

| | | | | |
|---|---|---|---|---|
| 3,679,538 A | * | 7/1972 | Druin et al. | 161/159 |
| 4,107,092 A | * | 8/1978 | Carnahan et al. | 252/511 |
| 4,436,888 A | * | 3/1984 | Copple | 526/348.1 |
| 4,539,256 A | * | 9/1985 | Shipman | 428/315.5 |
| 4,634,739 A | * | 1/1987 | Vassilatos | 525/240 |
| 4,650,730 A | * | 3/1987 | Lundquist et al. | 429/62 |
| 4,731,304 A | | 3/1988 | Lundquist et al. | 429/62 |
| 4,882,466 A | * | 11/1989 | Friel | 219/219 |
| 5,240,655 A | | 8/1993 | Troffkin et al. | 264/28 |
| 5,281,491 A | | 1/1994 | Rein | 429/62 |
| 5,480,745 A | | 1/1996 | Nishiyama | 429/242 |
| 5,565,281 A | | 10/1996 | Yu et al. | 429/62 |
| 5,888,640 A | * | 7/1997 | Marotta et al. | 428/308.4 |
| 5,667,911 A | * | 9/1997 | Yu et al. | 429/144 |
| 5,691,077 A | * | 11/1997 | Yu et al. | 429/62 |
| 5,731,074 A | * | 3/1998 | Nishiyama et al. | 428/315.9 |
| 5,824,430 A | * | 10/1998 | Higuchi et al. | 429/62 |
| 5,851,610 A | * | 12/1998 | Ristey et al. | 428/34.9 |
| 5,993,954 A | * | 11/1999 | Radovanovic et al. | 428/315.5 |

FOREIGN PATENT DOCUMENTS

| | | | | |
|---|---|---|---|---|
| EP | 0099228 | * | 1/1984 | 429/62 |
| EP | 0 794 583 A1 | | 9/1997 | H01M/2/16 |
| GB | 2 298 817 A | | 9/1996 | B32B/27/32 |
| JP | 3-203160 | | 9/1991 | H01M/2/16 |
| JP | 98394/1994 | | 5/1994 | |
| JP | 98395/1994 | | 5/1994 | |
| JP | 8-250097 | | 9/1996 | H01M/2/16 |
| JP | 8-266398 | | 10/1996 | C08J/9/00 |
| JP | 8-293612 | | 11/1996 | C08J/9/36 |
| JP | 10-154499 | * | 6/1998 | 429/62 |

OTHER PUBLICATIONS

TRP—Polymer Morphology and Processing, p. 3 of 3, Intelligent Systems Laboratory, Michigan State University.*
I&EC Product Research & Development, "Microporous Polymeric Films", vol. 13, pp. 2–9, Mar. 1974 H.S. Bierenbaum et al.

* cited by examiner

Primary Examiner—Tom Dunn
Assistant Examiner—L. Edmondson
(74) Attorney, Agent, or Firm—Robert H. Hammer III

(57) ABSTRACT

A fusible, structurally stabilized battery separator is disclosed. The separator is formed by extruding a cylindrical parison of a polymer film and quenching the film on both sides with a low temperature fluid stream prior to processing the film to impart microporosity. Most preferably, the film includes at least a polyethylene layer and polypropylene layer.

20 Claims, 5 Drawing Sheets

STRUCTURALLY STABLE FUSIBLE BATTERY SEPARATORS AND METHOD OF MAKING SAME

TECHNICAL FIELD

The present invention relates to battery separators and particularly to battery separators exhibiting an extended high electrical resistance profile over temperatures to 180° C. or more.

BACKGROUND

Batteries separators may be prepared by various techniques, for example, by way of extraction, or by way of a multi-step annealing/stretching process. This latter process was discovered by the Celanese Plastics Company of Summit, New Jersey in the early 1970's. A crystalline polymer, such as polypropylene is first extruded into a film under conditions which enhance stress in the molten polymer. It is desirable to anneal the film in an untensioned or low tensioned state to perfect the necessary crystalline structure. The precursor thus prepared is elongated in the machine direction to introduce a network of slit-like voids. The deformation process may be used to control the pore size and pore size distribution as well as the overall porosity. See Bierenbaum, H. S., Isaacson, R. B., Druin, M. L., and Plovan, S. G., Microporous Polymeric Films, I & EC PRODUCT RESEARCH AND DEVELOPMENT, Vol. 13, pp. 2–9, March, 1974.

As battery design requirements became more sophisticated, the characteristics of battery separators over various temperature ranges has also been refined. Fusible separators with suitable "shut down" characteristics are particularly desirable as is apparent from the most recent literature.

U.S. Pat. No. 4,650,730 to Lundquist et al. discloses a multi-ply polymeric sheet useful as a battery separator. Typically, the sheet includes a first layer in the form of a microporous sheet (unfilled) and a second, filled microporous sheet. The microporous component sheets are produced by an extraction process, then laminated together to form the structure, which will become non-porous at elevated temperatures. Note column 11, example 1. The claims specify a thickness of less than 10 mils per layer, various pore sizes and filler loadings. See also U.S. Pat. No. 4,731,304 to Lundquist et al.

U.S. Pat. No. 5,281,491 to Rein et al. is directed to a multi-ply unfilled sheet product reported to be useful as a "shut-down" battery separator. The product is formed by co-extrusion (blown film) followed by extraction. See Columns 6–8; examples 1–6. It is noted in Column 10 that uniaxial stretching can be used to impart porosity.

U.S. Pat. No. 5,240,655 to Troffkin et al. describes yet another possible process for making a multi-ply battery separator. The process therein described includes a first co-extrusion step, followed by cold (liquid nitrogen) stretching, followed by warm stretching, followed by annealing.

Japanese Patent Application Nos. 98394 and 98395 of Kurauchi et al. teach a porous film. Both documents refer to co-extrusion as a fabrication possibility, however, note that lamination of films is the preferred option, followed by heat treatment and two-step stretching to impart porosity.

U.S. Pat. No. 5,667,911 to Yu et al. teaches a process for making seamless, cross-piled battery separators. The method described involves extruding a tubular film, collapsing the film, annealing, cold stretching, hot stretching and heat setting to produce microporous membranes. The membranes are then spirally slit and subsequently laminated.

U.S. Pat. No. 5,565,281 to Yu et al. teaches a process not unlike the '911 patent as applied to making a thin, bi-layer shutdown battery separator of high puncture strength. Particular parameters appear in the specification and claims. See also, U.S. Pat. No. 5,691,077 directed to making a thin tri-layer membrane including two outer polypropylene membranes sandwiching a microporous polyethylene membrane. Note Table 8, column 9.

U.K. Publication No. 2, 298,817 discloses a porous film prepared by forming a non-porous laminate, stretching the laminate to impart porosity, followed by heat treatment. See p. 9 and following. The laminate may be prepared initially by co-extrusion as set forth in example 1, p. 13 and following. A similar process to prepare A/B/A tri-layer films is described in Kokai 8-250097. Note working examples. See also European Publication No. 0 794 583 at p. 5, lines 48 and following. Note FIG. 1(c) thereof.

Additional tri-layer membranes are disclosed in Japanese Patent Application Nos. 8-266398 and 8-293612 and Kokai 10-154499.

As can be seen from the foregoing, there has been continuous refinement of battery separator preparation, particularly in connection with multi-layer separators. Early developments involve making a plurality of porous structures followed by lamination to complete fabrication. Thereafter non-porous films, separately prepared, were laminated together and the multi-layer non-porous structures were further processed to impart porosity to the product. Most recently multiple layers are co-extruded into a single non-porous structure which is processed into a porous structure thereby minimizing the number of processing steps needed to make the product.

So also, it is desirable to improve the thermal characteristics of battery separators, particularly with respect to "shut-down" properties desirable in the high performance market. Ideally, a membrane designed for service where a thermal shut-down is desired should radically increase its impedance at a first temperature threshold of 120–130° C. or so and continue exhibiting increased impedance as long as it is possible, up to the crystalline melting point of the polymer or beyond at high rates of temperature increase. Some of the more recent literature in the field recognize such desirable characteristics.

Asahi Chemical Industry Co., Ltd. Discloses in Laid-Open Application No. 3-203160 a temperature resistant battery separator with a maximum impedance at least about 10° C. higher than the temperature at which the impedance of the separator initially rises to 10 times its value at room temperature (R25). The porous membranes are prepared by way of extraction from high molecular weight polyethylene and maximum impedance temperatures at scan rates of 2° C. per minute are reported to be up to about 25° C. higher than the temperature at which impedance initially begins to rise.

U.S. Pat. No. 5,480,745 to Nishiyama et al., discloses co-extruded porous bi-layer films, where one layer is polypropylene and one layer is a mixture of polyethylene and polypropylene. The membranes are reported to exhibit a rise in impedance at about 130° C. and a decay in impedance at about 170° C.

It has been found in accordance with the present invention that membranes with enhanced resistance performance against temperature are prepared by rapidly quenching a molten film prior to imparting porosity to the separator.

SUMMARY OF THE INVENTION

There is provided in accordance with the present invention a battery separator formed of a microporous polyolefinic membrane generally capable of maintaining an electrical resistance greater than about 10,000 ohms-square centimeter at a temperature of at least about 185° C. as measured at a scan rate of 60° C. per minute. Typically the membrane is capable of maintaining an electrical resistance of greater than about 10,000 ohms-square centimeter at a temperature of at least about 185° C. at a scan rate of 2° C. per minute; while, preferably, membranes in accordance with the invention are capable of maintaining an electrical resistance greater than about 10,000 ohms-square centimeter at temperatures from about 130° C. to at least 185° C. as measured at a scan rate of either 60° C. per minute or 2° C. per minute. Most preferably the foregoing high resistance is maintained to 195° C. or more, such as 200° C. or more at scan rates of 2° C. per minute or 60° C. per minute.

The separator in accordance with the invention may be made from a variety of polymers including high density polyethylene, isotactic polypropylene or combinations thereof. Other polypropylenes and polyethylenes such as ultra high molecular weight polyethylenes may be employed. In the most preferred embodiments, multi-layer membranes are employed having at least one polypropylene layer and at least one polyethylene layer. Tri-layer membranes are particularly preferred.

In another aspect of the invention, there is provided a method of making a battery separator including the steps of: extruding a polymer film in a molten state in the form of a cylindrical parison having first and second surfaces; applying a low temperature fluid stream to both the first and second surfaces of the cylindrical parison, the low temperature fluid stream being operative to quench the molten polymer film such that it is in a substantially solidified state; followed by imparting microporosity to said polymer film to make the battery separator. Most preferably the process includes co-extruding a polymer film with at least one polyethylene layer and at least one polypropylene layer.

Following quenching of the polymer film in accordance with the inventive process, microporosity is most preferably imparted to the film by annealing the film to enhance its crystalline structure, elongating the film and heat setting it to provide dimensional stability. The step of elongating the film preferably includes elongating the film by at least about 20% at a low temperature (15–35° C.) followed by further elongating the film at an elevated temperature (110° C.–130° C.) by at least about 100%. Relaxation upon heat setting is typically about 8% to about 15%.

BRIEF DESCRIPTION OF THE DRAWINGS

The invention is described in detail below in connection with numerous examples and various drawings. In the drawings.

Detailed Description

The invention is described in detail below with reference to numerous examples which are provided for purposes of illustration only. The spirit and scope of the present invention is defined in the appended claims.

The preferred process by which the inventive separators are made broadly comprises the following steps: extruding a polymer film to form a sheet; annealing the sheet to enhance the crystal structure and stretching the annealed sheet. The following references, as well as the reference cited therein, illustrate the state of the art of the preferred process and are incorporated herein by reference: U.S. Pat. No. 5,565,281 of Yu et al.; U.S. Pat. No. 5,691,077 of Yu; and U.S. Pat. No. 5,667,911 of Yu et al. Knowledge of these methods being readily available to those of skill in the art, the inventive process shall be described by explaining differences between the prior art and the inventive method for making battery separators in accordance with the invention.

Broadly, process improvements which produce films in accordance with the present invention involve utilizing an apparatus which applies a quenching fluid, such as air, to both sides of the polymer sheet as illustrated in connection with FIGS. 1 and 2.

Figure 1:
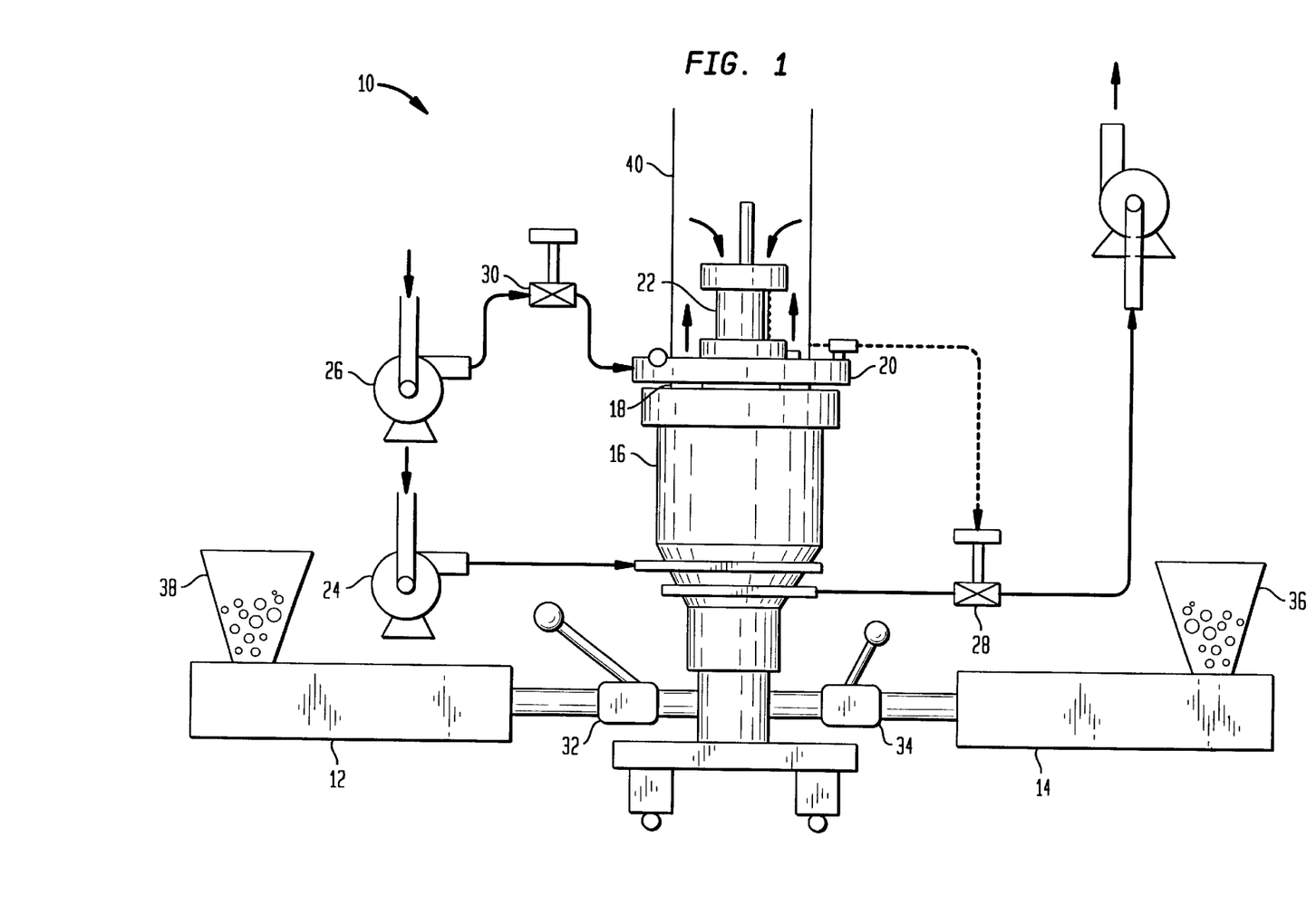
FIG. 1 is a schematic diagram illustrating an extrusion apparatus useful for manufacturing membranes in accordance with the present invention.

There is shown in FIG. 1 a schematic representation of an extrusion apparatus capable of co-extruding a multi-layer cylindrical parison. An extrusion apparatus 10 includes generally a first extruder 12 and a second extruder 14 connected to a die assembly 16. Assembly 16 defines a of die orifice indicated at 18 as well as an outer air quench ring 20 and an inner quench ring apparatus 22, as shown in FIGS. 1 and 2. Cooling air is supplied by way of a fan 24 to die assembly 16 and inner quench ring apparatus 22. Another fan 26 supplies cooling air to the outer quench ring 20. A plurality of valves 28, 30 control air flow; while polymer flow can be controlled by shut off valves 32 and 34.

In operation, polymer pellets 36, 38 are melted in extruders 12, 14 and fed through valves 32, 34 to die assembly 16. One may choose to feed only one polymer to make it monolayer film if so desired by utilizing only one extruder, or employ more than two extruders to make multi-layer separators. In each case, a suitable die is configured to extrude one layer or co-extrude multiple layers.

Fully molten polymers are fed to die assembly 16 and extruded through orifice 18. Upon exit, cylindrical film parison 40 is molten as it meets the cooling air streams on both sides of the film, as is better illustrated in connection with FIG. 2.

Figure 2:
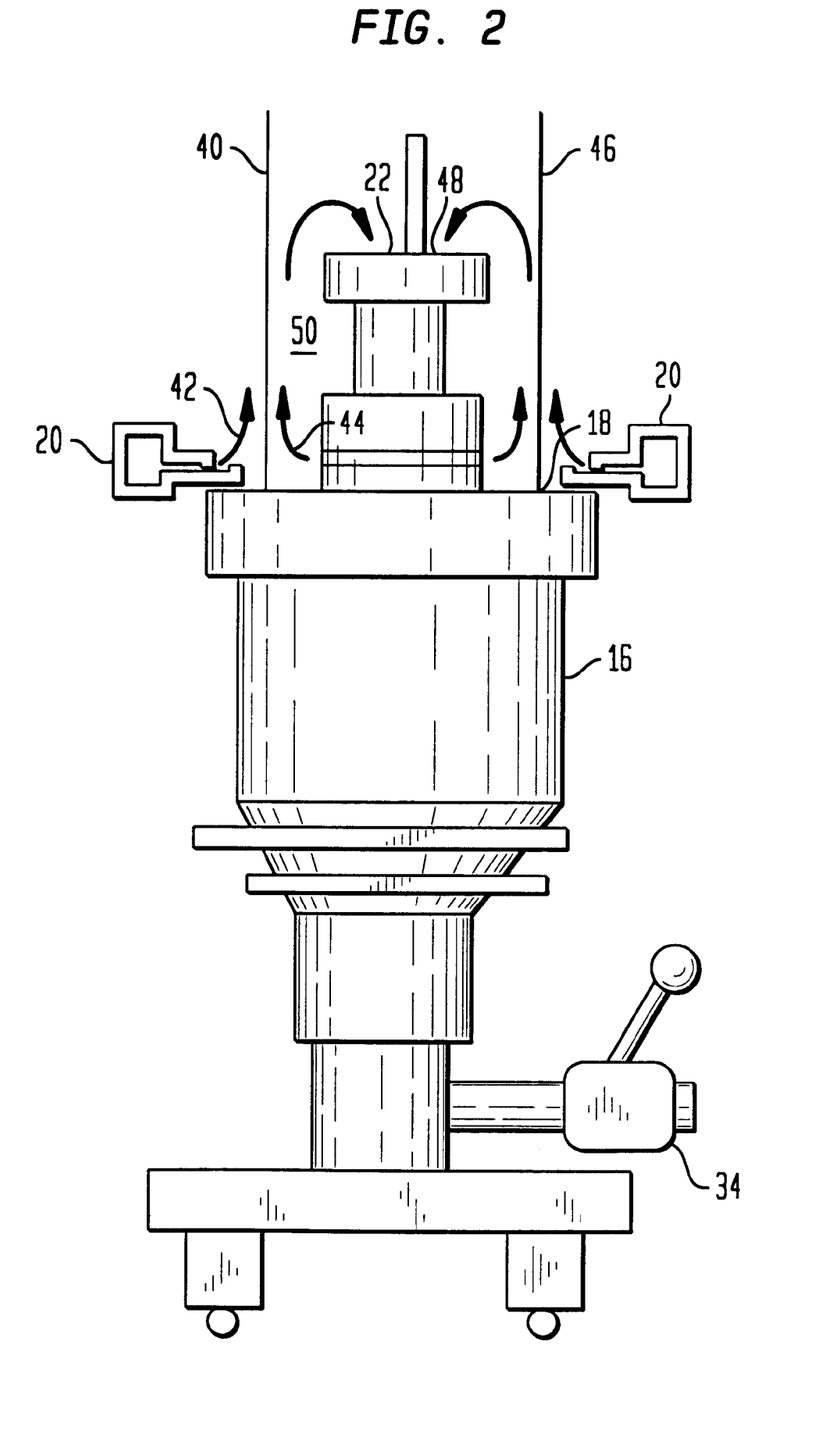
FIG. 2 is a detail of the apparatus of FIG. 1 showing the operation of the quench of both sides of the cylindrical polymer film parison.

In FIG. 2, like parts are indicated with the same numerals as in FIG. 1. As cylindrical film 40 exits orifice 18 it is molten and there is applied about its entire outer periphery an outer quenching air stream indicated at 42 and about its entire inner periphery another quenching air stream indicated at 44. Both air streams 42, 44, are low temperature air streams generally from about 0° C. to about 45° C., with about 15–30° C. being more typical. Air streams 42, 44 are operative to fully quench the melt phase of film 40 such that it is in a substantially solidified state at 46.

Apparatus 22 includes an exit suction orifice indicated at 48, so that the volume of air stream 44 can exit a cavity 50 defined by cylindrical film 40 as is desired in order to control pressure.

Figure 3:
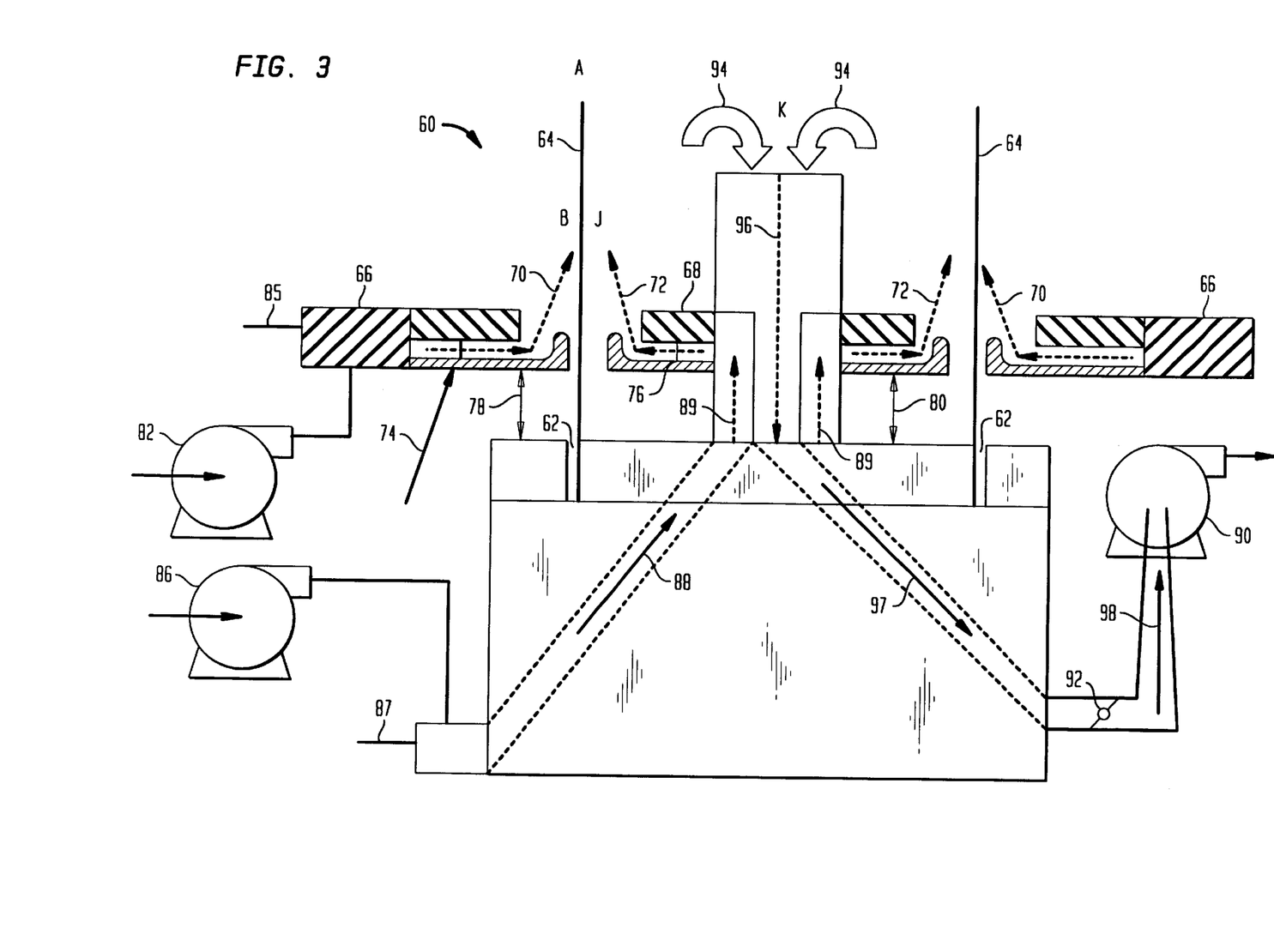
FIG. 3 is another more detailed schematic diagram illustrating operation of the inventive process.

There is shown in FIG. 3 a more detailed quench apparatus 60 utilized in connection with the examples which follow. Apparatus 60 includes a die exit 62 from which molten polymer exits the die to form a cylindrical parison 64. There is also provided an outer air ring 66 and an inner air ring 68 to provide quenching air to both sides of film parison 64. Air paths are thus defined as shown by arrows 70, 72. Each air ring defines an adjustable gap 74, 76 which may be set as desired and is located at an adjustable height 78, 80 above die exit 62 as noted in the examples which follow. The gaps are adjusted along with the various pressures and valves to regulate air flow as desired.

A blower 82 provides air to outer air ring 66 as shown and the pressure may be measured at 85, while another blower 86 provides air to inner ring 68 where the pressure is measured by a gauge at 87. Air flows to the inner ring as indicated by arrows 88, 89.

There is further provided an exhaust blower 90 which is provided with a control valve 92 to control flow out of the interior of cylindrical parison 64 as shown by arrows 94, 96, 97 and 98 which indicate the inside air ring return path.

In the foregoing manner, a quenching air stream is applied to both sides of a cylindrical parison as it exits a circular die to provide a double sided quench of the molten polymer as it exits the die. Blowers 82, 86 are provided with chillers to cool the output air, typically to a temperature of from about 15° to about 25° C.

The film thickness of the parison is generally from about 0.2 to about 2 thousandths of an inch (mils). The heights 78, 80 are typically set at from about ½ of an inch to about 6 inches, while air gaps 74, 76 are typically set at from about 80 to about 250 mils. The air pressure to each air ring is typically from about 0.8 inches of water to about 8 inches of water depending on the cooling desired. With an 11.87 inch diameter die, cylindrical parison 64 typically has a diameter of about 11.5 to about 12.5 inches; while the degree of expansion can be manipulated by way of the air flow and particularly by way of valve 92.

Following extrusion of the film as described above it is annealed, elongated and heat set as is further described in connection with the examples which follow. A series of multi-layer microporous battery separators were prepared as described in detail hereinafter. Product characteristics are reported in accordance with the following table:

TABLE 1

| | Test Methods |
|---|---|
| Gurley | ASTM-D726(B) Gurley is a resistance to air flow measured by the Gurley densometer (e.g. Model 4120). Gurley is the time in seconds required to pass 10 cc of air through one square inch of product under a pressure of 12.2 inches of water. |
| Basis Weight | Basis weight is determined by cutting three-one square foot samples across the width of the sample and weighing them on a precision balance with accuracy to 0.0001 grams. The three (3) samples are averaged and compared to tolerance limits. |

TABLE 1-continued

| | Test Methods |
|---|---|
| Thickness | Method: T411 om-83 developed under the auspices of the Technical Association of the Pulp and Paper Industry. Thickness is determined using a precision micrometer with a ½ inch diameter, circular shoe contacting the sample at seven (7) PSI. Ten (10) individual micrometer readings taken across the width of the sample are averaged. |
| Shrinkage, MD | ASTM D-1204 (60 min. @ 90° C.) Three separate lengths of stretched product of approximately ten centimeters are measured across the width of the sample in the machine direction (MD). The sample is exposed to air at 90° C. for one hour, the lengths are re-measured, the percentage shrinkage of the original length is calculated for each sample, and the results averaged. |

EXAMPLE 1

A 1 mil in thickness polypropylene/polyethylene/polypropylene microporous battery separator was prepared utilizing the apparatus shown in FIGS. 1 and 2. The inner and outer quench rings were supplied with air at room temperature and were positioned slightly over 3 inches in height from the die exit. Extrusion conditions are given in Table 2. Following extrusion, the sheet was annealed, stretched in a two step process and heat set under the conditions of Table 3. Product characteristics appear in Table 4.

TABLE 2

Summary of Materials and Extrusion Conditions for Battery Separator of Example 1

| | |
|---|---|
| Equipment: | Alpine 3 layer Co-extrusion die; 210 mil Mandrel gap, 300 mm die diameter |
| Resin: | Fina (Dallas, TX) PP 3362 isotactic polypropylene, Mitsu Petroleum Chemical (Tokyo, JP) HIZEX ® HDPE 5202B polyethylene |
| Polypropylene Extruder Barrel Temperature: | 195° C. |
| Polyethylene Extruder Barrel Temperature: | 185° C. |
| Die Temperature: | 185° C. |
| Line Speed: | 105 ft/sec |
| Quench Ring Height from Die Exit; inner, outer: | 3 5/16 inches, 3 5/16 inches |
| Quench Ring Air Pressure; inner, outer: | 7.0 inches H$_2$O, 7.0 inches H$_2$O |
| Quench Ring Gap; inner, outer (inches) | 0.200 inches, 0.150 inches |

TABLE 3

Summary of Annealing/Stretching Conditions for Battery Separator of Example 1

| | |
|---|---|
| Annealing Temperature: | 120° C. |
| Annealing Time: | 15 minutes |
| Cold Stretch Temperature: | 25° C. |
| Cold Stretch Elongation: | 25% |

TABLE 3-continued

Summary of Annealing/Stretching Conditions for Battery Separator of Example 1

| | |
|---|---|
| Hot Stretch Temperature: | 120° C. |
| Hot Stretch Elongation: | 100% |
| Heat Set Temperature: | 120° C. |

TABLE 4

Average Product Characteristics for Battery Separator of Example 1

| Gurley Secs | Thickness mils | Shrinkage % | Base Weight mg/cm2 | Porosity % |
|---|---|---|---|---|
| 26 | 0.9 | 3.5 | 1.26 | 37.2 |

EXAMPLE 2

Following the procedure of Example 1, a bi-layer polyethylene/polypropylene microporous battery separator was prepared. Materials, equipment and extrusion conditions appear in Table 5, while annealing and stretching conditions appear in Table 6. Average product characteristics appear in Table 7.

TABLE 5

Summary of Materials and Extrusion Conditions for Battery Separator of Example 2

| | |
|---|---|
| equipment: | Alpine two layer co-extrusion Die, 210 mil mandrel gap, 300 mm die diameter |
| resin: | Fina PP 3271 isotactic polypropylene, HIZEX ® 5202B high density polyethylene |
| Polypropylene Extruder Barrel Temperature: | 200° C. |
| Polyethylene Extruder Barrel Temperature: | 190° C. |
| Die Temperature: | 200° C. |
| Line Speed: | 100 ft/minute |
| Quench Ring Height from Die Exit; inner, outer: | 3 inches, 3 5/16 inches |
| Quench Ring Air Pressure: inner, outer: | 4 inches H₂O, 8 inches H₂O |
| Quench Ring Gap; inner, outer: | 0.200 inches, 0.150 inches |

TABLE 6

Summary of Annealing/Stretching Conditions for Battery Separator of Example 2

| | |
|---|---|
| Annealing Temperature: | 120° C. |
| Annealing Time: | 12 minutes |
| Cold Stretch Temperature: | 25° C. |
| Cold Stretch Elongation: | 25% |
| Hot Stretch Temperature: | 120° C. |
| Hot Stretch Elongation: | 130% |
| Heat Set Temperature: | 120° C. |

TABLE 7

Average Product Characteristics for Battery Separator of Example 2

| Gurley Secs | Thickness mils | Shrinkage % | Base Weight mg/cm2 | Porosity % |
|---|---|---|---|---|
| 25 | 1.0 | 4.5 | 1.32 | 43.0 |

EXAMPLE 3

Following the procedure of Example 1, another polypropylene/polyethylene/polypropylene tri-layer battery separator was prepared in accordance with the present invention. A summary of the materials and extrusion conditions appear in Table 8. Annealing, stretching and heat setting conditions are given in Table 9, while Table 10 sets forth product characteristics.

TABLE 8

Summary of Materials and Extrusion Conditions for Battery Separator of Example 3

| | |
|---|---|
| Equipment: | Alpine 3 layer co-extrusion die, 210 mil mandrel gap, 300 mm die diameter |
| Resin: | Fina 3271 isotactic polypropylene, HIZEX ® HDPE 5202B high density polyethylene |
| Polypropylene Extruder Barrel Temperature: | 190° C. |
| Polyethylene Extruder Barrel Temperature: | 185° C. |
| Die Temperature: | 200° C. |
| Line Speed: | 85 ft/sec. |
| Quench Ring Height from Die Exit; inner, outer: | 3 13/16 inches, 3 1/2 inches |
| Quench Ring Air Pressure; inner, outer: | 4 inches H₂O; 4 inches H₂O |
| Quench Ring Gap; inner, outer: | 0.250, 0.100 |

TABLE 9

Summary of Annealing/Stretching Conditions for Battery Separator of Example 3

| | |
|---|---|
| Annealing Temperature: | 122° C. |
| Annealing Time: | 12 minutes |
| Cold Stretch Temperature: | 25° C. |
| Cold Stretch Elongation: | 45% |
| Hot Stretch Temperature: | 122° C. |
| Hot Stretch Elongation: | 120% |
| Heat Set Temperature: | 122° C. |

TABLE 10

Average Product Characteristics for Battery Separator of Example 3

| Gurley Secs | Thickness mils | Shrinkage % | Base Weight mg/cm2 | Porosity % |
|---|---|---|---|---|
| 30 | 0.86 | 2.1 | 1.25 | 37 |

EXAMPLE 4

A polyethylene/polypropylene/polyethylene tri-layer battery separator was prepared in according to the Example 1 above. Extrusion particulars appear in Table 11, along with the equipment and materials employed. Annealing, stretch ing and heat setting conditions are given in Table 12, while representative product characteristics appear in Table 13.

TABLE 11

Summary of Materials and Extrusion Conditions For Battery Separator of Example 4

| | |
|---|---|
| Equipment: | Alpine Three layer co-extrusion Die; 140 mil gap/300 mm die diameter |
| Resin: | Fina, 3271 isotactic polypropylene HIZEX ® 5202B high density polyethylene |
| Polypropylene Extruder Barrel Temperature: | 195° C. |
| Polyethylene Extruder Barrel Temperature: | 185° C. |
| Die Temperature: | 200° C. |
| Line Speed: | 80 ft/min |
| Quench Ring Height from Die Exit; inner, outer: | 2 3/4 inches, 3 5/16 inches |
| Quench Ring Air Pressure; inner, outer: | 4 inches, 7 inches $H_2O$ |
| Quench Ring Air Gap; inner, outer: | 0.150 inches, 0.200 inches |

TABLE 12

Summary of Annealing/Stretching Conditions for the Battery Separator of Example 4

| | |
|---|---|
| Annealing Temperature: | 120° C. |
| Annealing Time: | 12 minutes |
| Cold Stretch Temperature: | 25° C. |
| Cold Stretch Elongation: | 25% |
| Hot Stretch Temperature: | 120° C. |
| Hot Stretch Elongation: | 130% |
| Heat Set Temperature: | 120° C. |

TABLE 13

Average Product Characteristics for Battery Separator of Example 4

| Gurley Sec | Thickness mils | Shrinkage % | Base Weight mg/cm2 | Porosity % |
|---|---|---|---|---|
| 33 | 1.07 | 3 | 1.4 | 41 |

EXAMPLE 5

Another polyethylene/polypropylene/polyethylene tri-layer battery separator was prepared in accordance with Example 4. Materials, equipment and extrusion conditions are listed in Table 14. Table 15 gives annealing, heat treating and stretching conditions, while Table 16 lists available product characteristics.

TABLE 14

Summary of Materials and Extrusion Conditions for Battery Separator Example 5

| | |
|---|---|
| Equipment: | Alpine 3 layer co-extrusion die; 140 mil mandrel gap, 300 mm die diameter |
| Resin: | Fina 3271 isotactic polypropylene HIZEX ® 5202B high density polyethylene |
| Polypropylene Extruder Barrel Temperature: | 195° C. |
| Polyethylene Extruder Barrel Temperature: | 190° C. |
| Die Temperature: | 193° C. |

TABLE 14-continued

Summary of Materials and Extrusion Conditions for Battery Separator Example 5

| | |
|---|---|
| Line Speed: | 90 ft/min. |
| Quench Ring Height from Die Exit; inner, outer: | 3 1/2 inches, 3 5/16 inches |
| Quench Ring Air Pressure; inner, outer: | 4 inches $H_2O$, 6 inches $H_2O$ |
| Quench Ring Gap; inner, outer: | 0.200 inches, 0.080 inches |

TABLE 15

Summary of Annealing/Stretching Conditions for Battery Separator of Example 5

| | |
|---|---|
| Annealing Temperature: | 120° C. |
| Annealing Time: | 12 minutes |
| Cold Stretch Temperature: | 25° C. |
| Cold Stretch Elongation: | 25% |
| Hot Stretch Temperature: | 120° C. |
| Hot Stretch Elongation: | 130% |
| Heat Set Temperature: | 120° C. |

TABLE 16

Average Product Characteristics for Battery Separator of Example 5

| Gurley Sec | Thickness mils | Shrinkage % | Base Weight mg/cm2 | Porosity % |
|---|---|---|---|---|
| 17 | 0.50 | — | — | — |

EXAMPLE 6

Following the procedure of Example 1, another polypropylene/ polyethylene/polypropylene tri-layer battery separator was prepared in accordance with the invention. Particulars as to equipment, materials, and extrusion conditions appear in Table 17. Table 18 lists annealing, stretching and heat setting parameters. Table 19 lists product characteristics.

TABLE 17

Summary of Materials and Extrusion Conditions for Battery Separator of Example 6

| | |
|---|---|
| Equipment: | Alpine 3 layer co-extrusion die, 140 mil mandrel gap, 300 mm die diameter |
| Resin: | Fina 3271 isotactic polypropylene, HIZEX ® 5202B high density polyethylene |
| Polypropylene Extruder Barrel Temperature: | 195° C. |
| Polyethylene Extruder Barrel Temperature: | 185° C. |
| Die Temperature: | 198° C. |
| Line Speed: | 80 ft/min |
| Quench Ring Height from Die Exit; inner, outer: | 3 inches, 3 5/16 inches |
| Quench Ring Air Pressure; inner, outer: | 2 inches $H_2O$, 3 inches $H_2O$ |
| Quench Ring Gap; inner, outer: | 0.080 inches, 0.200 inches |

TABLE 18

Summary of Annealing/Stretching Conditions
for Battery Separator of Example 6

| | |
|---|---|
| Annealing Temperature: | 125° C. |
| Annealing Time: | 8 minutes |
| Cold Stretch Temperature: | 25° C. |
| Cold Stretch Elongation: | 45% |
| Hot Stretch Temperature: | 118° C. |
| Hot Stretch Elongation: | 200% |
| Heat Set Temperature: | 125° C. |

TABLE 19

Average Product Characteristics for Battery Separator of Example 6

| Gurley Sec | Thickness mils | Shrinkage % | Base Weight mg/cm2 | Porosity % |
|---|---|---|---|---|
| 24 | 15 | 8 | 0.70 | 48 |

Electrical Resistance

Figure 4A:
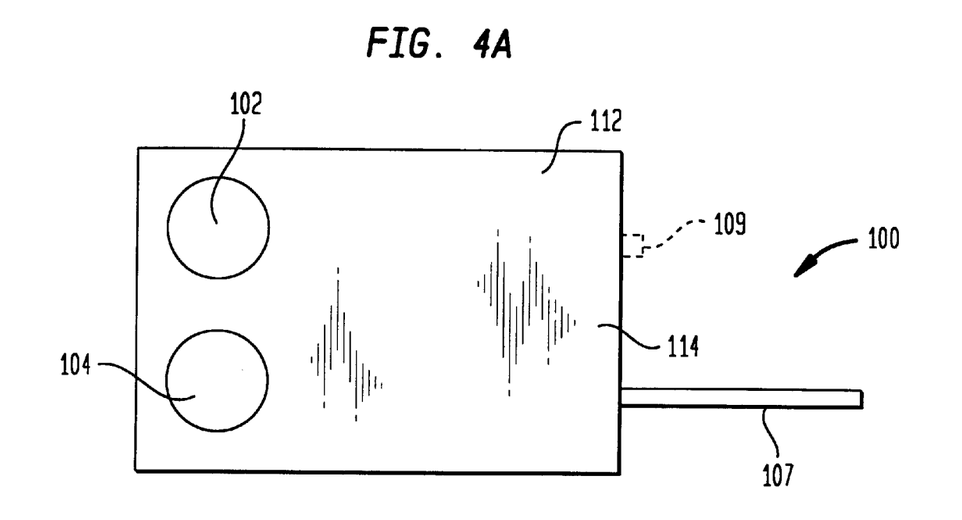
FIGS. 4A and 4B are schematic diagrams of a test cell used to measure electrical resistance of a microporous battery separator as a function of temperature.
Figure 4B:
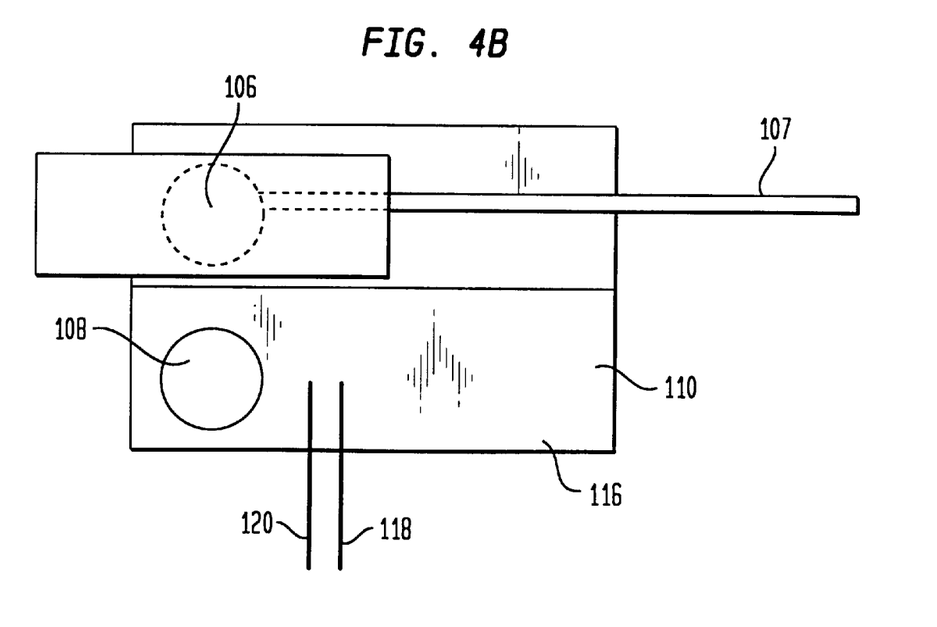

Despite the industry interest in shut down or fusible battery separators, there has been little work done on characterizing the phenomena involved. It is believed that in a thermal runaway situation in a battery, the temperature may rise at 100° C. per minute or more, perhaps multiples of such a heating rate. It is believed desirable for battery separators to exhibit large increases in electrical resistance at 120–130° C. and maintain such high resistance, say 10,000 ohms square centimeter or so, as long as possible. Polypropylene/polyethylene membranes have been employed wherein polyethylene melts at a lower temperature so as to block the microporous structure, while the polypropylene maintains it structure to a higher temperature. FIGS. 4A and 4B illustrate a measurement cell useful for characterizing the electrical properties of a battery separator versus temperature. Cell 100 includes four 0.375 inch diameter nickel disks 102, 104, 106 and 108 all of which are 3 mils thick embedded in a Kapton® polyimide film, 110, 112 which is also 3 mils thick. FIG. 4A illustrates the top of the test cell, while FIG. 4B illustrates the bottom of the test cell. The disks are fitted with nickel tabs indicated at 109.

Top assembly 114 and bottom assembly 116 are used to sandwich a separator by placing the separator there between and pressing the electrodes in a Carver press at a 125 psi with heated platens. The platens were heated at a constant rate from 60° C. to 200° C. using a Eurotherm® model 808 controller. The temperature of the electrode surface was sensed by two type E thermocouples indicated at 118, 120 (0.5 mil thick, not shown) which were located between a pair of electrodes positioned adjacent to the electrodes holding the separator.

The apparatus of FIGS. 4A and 4B is operated as described by Geiger et. al., "Advanced Separators for Lithium Batteries", 11$^{th}$ International Seminar on Primary and Secondary Battery Technology and Application, Feb. 28–Mar. 3, 1994. An electrolyte consisting of 1M lithium trifluoromethanane- sulfonimide (HQ-115, 3M3 Co.) in a 1:1 by volume solution of propylene carbonate (Aldrich), and triethylene glycol dimethyl ether (Aldrich) was used. The conductivity of this electrolyte does not vary significantly over the temperature range employed. Electrical resistance measurements were made using an RLC bridge (GenRad Model 1659) at 1 KHZ as described by Laman et. al., "Impedance Studies for Separators in Rechargeable Lithium Batteries", J. Electrochem. Soc., Vol. 140, No. 4, April, 1993, pp. L51–53.

Figure 5:
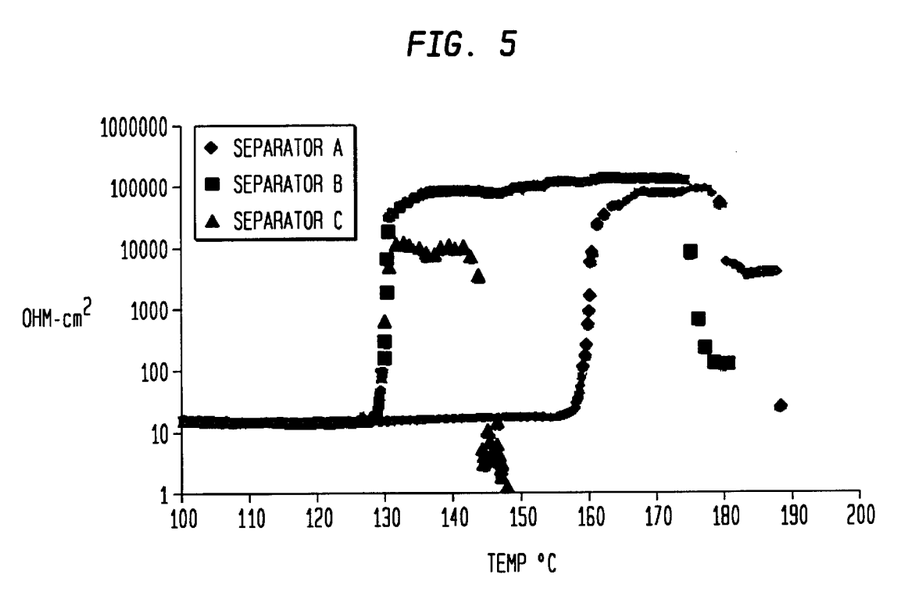
FIG. 5 is a plot of electrical resistance versus temperature for various commercially available membranes at a scan (heating) rate of 60° C. per minute.

FIG. 5 shows typical electrical resistance curves versus temperature for commercially available battery separators measured as above at a heating rate or scan rate of 60° C. per minute. Separator A is a polypropylene battery separator, Separator B is a polyethylene battery separator and Separator C is a polypropylene/polyethylene/polypropylene tri-layer separator. Separator C was also tested at a scan rate of 1° per minute and it was found that the high resistance exhibited above 130° C. or so exhibited a slightly lower upper temperature limit.

Figure 6:
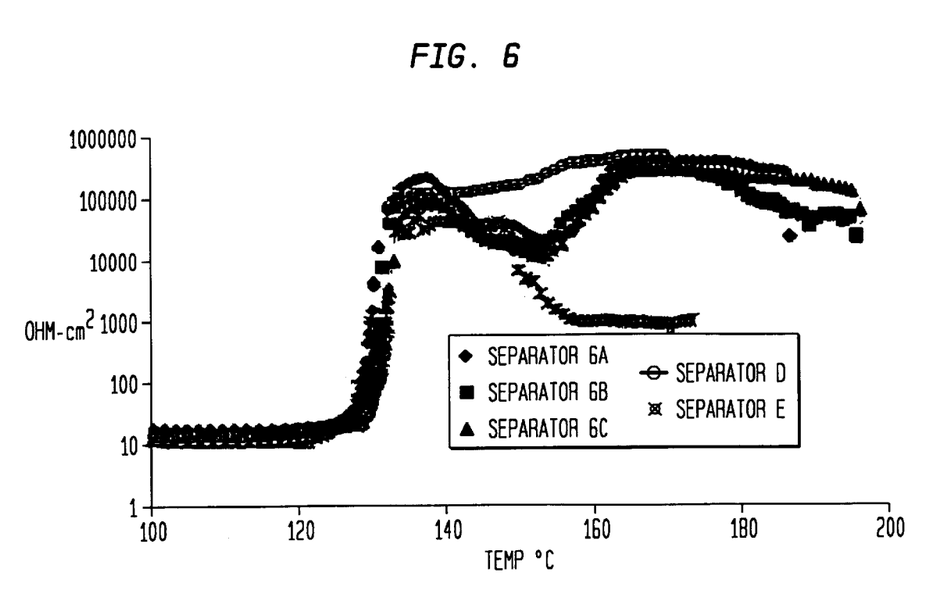
FIG. 6 is a plot of electrical resistance versus temperature for membranes manufactured in accordance with the present invention as well as two other commercially available membranes.

FIG. 6 shows electrical properties of five different separators measured as described above at scan rates of 60° C. per minute. Separators 6(a), 6(b), and 6(c) were polyethylene/polypropylene/polyethylene membranes prepared in accordance with Example 5. Separator D was a polypropylene/polyethylene/polypropylene commercially available separator, while Separator E was a commercially available high molecular weight polyethylene separator.

It can be seen from FIG. 6 that only the membranes in accordance with the invention exhibit electrical resistance greater than 10,000 ohms-square centimeters between 130° C. and 185° C. This characteristic is unique to the separators of the present invention which is further defined in the appended claims.

What is claimed is:

1. A battery separator comprising a microporous polyolefinic membrane capable of maintaining an electrical resistance through the separator of greater than about 10,000 ohms-square centimeter at a temperature of at least about 185° C. as measured at a scan rate of 60° C. per minute.

2. The battery separator according to claim 1, wherein said polyolefinic membrane is capable of maintaining an electrical resistance greater than about 10,000 ohms-square centimeter at a temperature of at least about 185° C. as measured as a scan rate of 2° C. per minute.

3. The battery separator according to claim 1, wherein said polyolefinic membrane is characterized by maintaining an electrical resistance greater than about 10,000 ohms-square centimeter over a temperature range of from about 130° C. to about 185° C. as measured at a scan rate of 60° C. per minute.

4. The battery separator according to claim 2, wherein said polyolefinic membrane is characterized by maintaining an electrical resistance greater than about 10,000 ohms-square centimeter over a temperature range of from about 130° C. to about 185° C. as measured at a scan rate of 2° C. per minute.

5. The battery separator according to claim 1 wherein said polyolefinic membrane is formed of a polymer selected from the group consisting of polyethylene, polypropylene and mixtures thereof.

6. The battery separator according to claim 5 wherein said polyolefinic membrane comprises a microporous polyolefinic formed of isotactic polypropylene.

7. The battery separator according to claim 5 wherein said polyolefinic membrane comprises a microporous membrane formed of high density polyethylene.

8. The battery separator according to claim 1 wherein said polyolefinic membrane is a multilayer polyolefinic membrane including at least one layer formed of polypropylene and at least one layer formed of polyethylene.

9. The battery separator according to claim 8, wherein said polyolefinic membrane is a bi-layer membrane.

10. The battery separator according to claim 8, wherein said membrane is a polypropylene-polyethylene-polypropylene tri-layer membrane.

11. A method of making a battery separator comprising:
(a) extruding a cylindrical parison of a polymer film in a molten state having inner and outer surfaces;
(b) quenching the molten parison with a low temperature fluid stream applied to both surfaces of the parison such that it is in a substantially solidified state; and
(c) imparting porosity to said polymer film to make said microporous separator.

12. The method according to claim 11, wherein said method of extruding said polymer film includes co-extruding a polymer film with at least 2 layers of different composition.

13. The method according to claim 12, wherein said polymer film includes a polyethylene layer and a polypropylene layer.

14. The method according to claim 13, wherein said polyethylene layer is formed of high density polyethylene and said polypropylene layer is formed of isotactic polypropylene.

15. A method of making a battery separator comprising:
(a) extruding a cylindrical parison of a polymer film in a molten state having inner and outer surfaces;
(b) quenching the molten parison with a low temperature fluid stream applied to both surfaces of the parison such that it is in a substantially solidified state;
(c) annealing said polymer film to enhance its crystalline structure;
(d) elongating said film to impart porosity to the film; and
(e) heat setting said film.

16. The method according to claim 15, wherein said step of elongating said film comprises:
(f) elongating said film by at least about 20 per cent at a low temperature followed by;
(g) elongating said film at an elevated temperature by at least about 100 per cent.

17. The method according to claim 16, wherein said low temperature is from about 15 to about 35° C.

18. The method according to claim 16, wherein said high temperature is from about 110° C. to about 135° C.

19. The method according to claim 15, wherein said polymer film includes a polyethylene layer and a polypropylene layer.

20. The method according to claim 19, wherein said polypropylene layer is formed of isotactic polypropylene.

* * * * *